Dec. 31, 1935.  W. H. FRANK  2,025,813

ELECTRICAL DISTRIBUTION SYSTEM

Filed Dec. 1, 1933

INVENTOR.
William H. Frank
BY
Daniel G. Cullen
ATTORNEY.

Patented Dec. 31, 1935

2,025,813

UNITED STATES PATENT OFFICE 2,025,813

ELECTRICAL DISTRIBUTION SYSTEM

William H. Frank, Detroit, Mich., assignor to Bulldog Electric Products Company, Detroit, Mich., a corporation of West Virginia Application December 1, 1933, Serial No. 700,596

8 Claims. (Cl. 247—3)

The inventions of this application relate to electrical distribution systems and more particularly to systems of the type comprising a stationary elongated duct and a current lead-off device or trolley which may be moved along the duct to take current therefrom at various points along the latter.

The details of construction of the system here disclosed will be described in the following specification so as to be readily understandable by those skilled in the art, which specification may be more clearly understood upon reference to the appended drawing. In this drawing, Fig. 1 is a top plan fragmentary view of one form of duct of the invention, there being shown in this figure the manner in which a juncture is effected between duct sections, and the manner in which the duct is formed to facilitate the association therewith of a trolley;

The duct of Figs. 1-7

Figure 6:
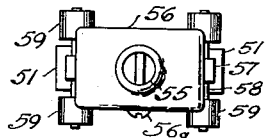
Fig. 6 is a top plan view of the trolley of Figs. 4 and 5.

The duct of Figs. 1 to 7 comprises a sheet metal channel-shaped casing 20 having a bottom 21, front and back flanges 22, and top wing flanges 23 having beaded edges 24 separated by a runway space 25; the bottom wall 21 connects the front and back flanges and is joined to them by the beads indicated at 27. Disposed against the bottom wall 26 and with its edges encompassed within the beads 27 is a copper ribbon 28 which is to serve as a bus bar; this ribbon is insulated from the casing in any suitable manner, as for example, by means of a strip 29 of rigid insulation which receives the bus bar 28 and has its edges folded over the edges of the bus bar 28, with its folds and the bus bar edges encompassed and securely clamped within the beads 27.

Figure 1:
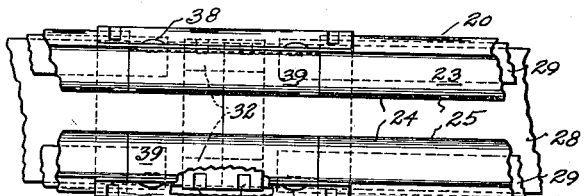
Figure 4:
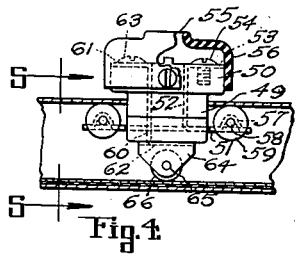
Fig. 4 is an elevational section of a duct fragment, in which is disposed one form of trolley of the invention.
Figure 2:
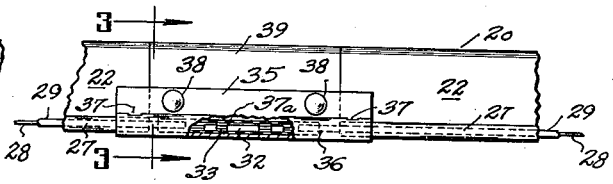
Fig. 2 is a front elevational view of the duct fragment of Fig. 1.
Figures 3, 5:
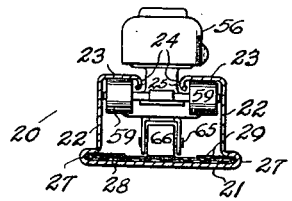
Fig. 3 is a transverse sectional view of the duct per se at a duct juncture, and as if on line 3—3 of Fig. 2.
Fig. 5 is a transverse section, as if on the line 5—5 of Fig. 4.
Figure 7:
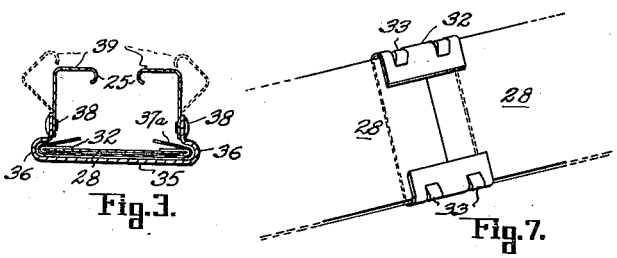
Fig. 7 is a detail view of a bus bar splice.

In the duct of Figs. 1 to 3 but one bus bar is provided, it being intended that the duct casing itself, being of sheet metal, will serve as an electrical return.

A run of the duct is made up of sections, each of which may be pre-equipped, that is to say, factory formed, with each section of duct containing a section of casing, a section of bus bar 28, and a section of insulation 29, all relatively nested or assembled and secured. The sections are joined to each other at their proximate ends by mechanical and electrical juncture means, and the joining of the sections may be effected in the factory or at the place of installation.

A suitable juncture means for duct section ends to form a continuous duct is shown in Figs. 1 to 7, and such juncture means will now be described. It is understood that the duct sections are so formed that their bus bar sections project beyond the ends of the casing sections, so that when adjoining duct sections are placed in end to end juxtaposition, the juxtaposed ends of the bus bars 28 may be joined, as by means of the copper tie 32 which partially surrounds the ends of the bus bars, the tie being in the form of a flat strip having its ends folded over the edges of the bus bars at the ends of the latter, the tie further having its folds crimped, as at 33, to interlock the tie to the bus bar ends. It is to be understood that the bus bars and their ties 32 are to be enfolded within insulation strips and for this reason the ties 32 are made of thin ribbon material and are clamped down tightly and firmly so as to be of as small a cross section as possible. It is also observed that the space between the edges of the ties 32 is clear so that a continuous run from the end of one bus bar on to the end of another is assured without there being any possibility of the trolley surface, namely the exposed surface of the bus bars, being interrupted.

The casing juncture comprises a channel shaped base sleeve of sheet metal, referenced 35, which receives the ends of adjacent casing sections and has beads at 36 for receiving the beads 27 of the casing sections, the dimensions of the parts being such that the casing ends are tightly received within the ends of the sleeve 36, thus forming a secure mechanical and electrical connection between adjacent ends of casing sections. The sleeve beads 36 and the duct section beads 27 are provided with mutual crimps at 37 which effectively secure the sleeve to the duct sections, and also serve to bond the sleeve to the duct sections electrically by breaking through the insulating paint or enamel coating on these parts. The sleeve is lined with insulation 37a enfolded therewithin and positioned between the ends of duct sections to overlap the ends of the insulation strips 29 and thereby insulate the bus bar ends and the tie 32 from the sleeve 35.

To the upper edges of the sleeve 35 are hingedly secured, as by rivets 38, or other forms of hinges, thin sheet metal L shaped strips 39 similar in contour to the corresponding parts 22 to 24 of the casing sections, to complete the duct enclosure at the junctions. The hinge connections at 38 permit the strips 39 to be sprung apart or separated, i. e. moved to the dotted line positions of Fig. 3, so as to permit trolleys, about to be described, to be inserted into the duct at the duct junctures.

It will be observed that the parts heretofore described comprise a compact and inexpensive duct, provided with satisfactory junctures between duct sections, and also provided with spaced entrances for trolleys. It will also be observed that all the requirements to be observed in the manufacture of satisfactory duct have been observed in the manufacture of the duct heretofore described. For example, the duct casing is completely insulated from the bus bar 28; the bus bar 28 provides a smooth and uninterrupted run for a roller or collector; the parts of the duct are relatively secured, electrically and mechanically, so that no shifting, loosening, or short-circuiting of the parts is possible. The duct is compact and presents no outwardly projecting parts adapted to be broken by externally moving parts; the duct is inexpensive; it may be factory made, and may be installed readily, with as many sections to an installation as necessary; all in accordance with the requirements of satisfactory duct manufacture.

For use with the duct of Figs. 1 to 7, there is provided a trolley comprising a body 49 of molded insulation, insertable into and movable along the duct, with a portion received in the runway 25 between the beads 24; the body has on its upper portion a head 50. Molded within the body 49 is a thin sheet metal strap 51, preferably of phosphor-bronze, which has its central portion cut out and bent up, as at 52, to project upwardly through the body with its terminal portion 53 exposed on the head 50 to receive a binding screw 54 for a cable introduced through the hole at 55 of the insulating cap 56 which is disposed on and over the head 50 of the body 49, being secured thereto by a screw 56a. The ends of the strap 51 which project longitudinally from the body 49 may well be formed as collector shoes, or slide contacts, but preferably are formed to provide saddles 57 which receive the axles 58 upon the ends of which are rollers 59, these being adapted to engage the upper or wing surfaces 23 of the duct to ride therealong. The strap 51 is formed with an inherent tendency to deflect upwardly so that the ends thereof, bearing rollers 59, are urged against the surfaces 23.

Also molded within the body 49 is a second strap 60, the latter having its terminal ends exposed on the upper and lower surfaces of the body as at 61 and 62; the strap 60 passes through the opening in the strap 51 which had been cut out to form the strap part 52, and the strap 60 is insulated from the edges of the opening of the strap 51 by the molded insulated material which is disposed between them. The end 61 forms a binding means on the head 50 of the body 49 for receiving a binding screw 63 for a cable adapted to be inserted through hole 55 of the cap 56. The end 62, exposed below the body 49, is formed integral with a U-shaped piece 64 whose vertical wings receive the axle 65 upon which is disposed a collector roller 66, the latter riding on the exposed surface of the bus bars 28.

The trolley of Figs. 1 to 7 can be seen to be inexpensive and yet satisfactory from all points of view, and a detailed recital of the features of this trolley which make it satisfactory is not believed to be necessary in view of the description heretofore given of the trolley parts.

Modifications might be presented at the present time but are not here described inasmuch as they might readily be contemplated by those skilled in the art upon following the teachings heretofore given and it is to be understood that the inventions of this application are not to be considered as limited to the specific constructions here disclosed, but only by the scope of the claims which follow.

I claim:

1. A bus duct run comprising standardized bus duct sections, each having open ends and a slot, the sections being disposed in substantially end to end relation, but with spaces between the ends, means between the ends for joining them and having portions registering with duct section portions, and a slot registering with duct section slots, the means being formed to permit substantial widening of the slot at the junctures, without requiring removal of the means from the run.

2. A slotted trolley duct run having rail portions and other portions and comprising slotted duct sections having proximate but spaced ends, and juncture means between the proximate but spaced ends of the duct sections comprising a coupling sleeve engaging and connecting the proximate but spaced duct section ends and having laterally spaced rail portions fitting between the spaced ends of the sections and registering with their rail portions to form smooth continuations thereof, and having a slot therebetween registering with the slots of the duct sections.

3. A slotted trolley duct run having rail portions and other portions and comprising slotted duct sections having proximate but spaced ends, and juncture means between the proximate but spaced ends of the duct sections comprising a coupling sleeve engaging and connecting the proximate but spaced duct section ends and having laterally spaced rail portions fitting between the spaced ends of the sections and registering with their rail portions to form smooth continuations thereof, and having a slot therebetween registering with the slots of the duct sections the rail portions of the sleeves being relatively separable without their or the coupling sleeves being removed in disassociation from the duct to permit substantial widening of the slot therebetween.

4. A trolley duct run comprising standardized bus duct sections having rail portions and other portions, each section having open ends and a slot, the sections being disposed in substantially end to end relation, but with spaces between the ends, coupling means between the section ends and having extensions engaging and connecting the section ends for joining them, and having rail portions between the ends in planar registration with duct section rail portions to form smooth continuations thereof, and a slot registering with duct section slots to form a continuation thereof.

5. A trolley duct run comprising standardized bus duct sections having rail portions and other portions, each section having open ends and a slot, the sections being disposed in substantially end to end relation, but with spaces between the ends, coupling means between the section ends and having extensions engaging and connecting the section ends for joining them, and having rail portions between the ends in planar registration with duct section rail portions to form smooth continuations thereof, and a slot registering with duct section slots to form a continuation thereof, the coupling means being formed to permit substantial widening of the slot at the junctures, without requiring removal and disassociation of the coupling means from the run.

6. A slotted sectional bus duct run having rail portions and bus bar portions and comprising slotted duct sections having proximate but spaced ends, the bus bar ends joining in the spaces between duct section ends, and juncture means between the proximate but spaced ends of the duct sections engaging and connecting the proximate but spaced duct section ends and having rail portions fitting between the spaced ends of the duct sections and registering with their rail portions to form smooth continuations thereof, and having slots registering with the slots of the duct sections to form smooth continuations thereof, the means being manipulable for exposing the bus bar junctures at the spaces.

7. A slotted sectional bus duct run having rail portions and bus bar portions and comprising slotted duct sections having proximate but spaced ends, the bus bar ends joining in the spaces between duct section ends, and juncture means between the proximate but spaced ends of the duct sections engaging and connecting the proximate but spaced duct section ends and having rail portions fitting between the spaced ends of the duct sections and registering with their rail portions to form smooth continuations thereof, and having slots registering with the slots of the duct sections to form smooth continuations thereof, the means being manipulable for widening their slots to provide intermediate entrances for trolleys.

8. A slotted sectional bus duct run having rail portions and bus bar portions and comprising slotted duct sections having proximate but spaced ends, the bus bar ends joining in the spaces between duct section ends, and juncture means between the proximate but spaced ends of the duct sections engaging and connecting the proximate but spaced duct section ends and having rail portions fitting between the spaced ends of the duct sections and registering with their rail portions to form smooth continuations thereof, and having slots registering with the slots of the duct sections to form smooth continuations thereof, the means being manipulable for widening their slots to provide intermediate entrances for trolleys and for exposing the bus bar junctures at the spaces.

WILLIAM H. FRANK.